United States Patent
Hardage et al.

(10) Patent No.: US 6,415,362 B1
(45) Date of Patent: Jul. 2, 2002

(54) METHOD AND SYSTEM FOR WRITE-THROUGH STORES OF VARYING SIZES

(75) Inventors: James Nolan Hardage, Kyle; Alexander Edward Okpisz; Thomas Albert Petersen, both of Austin, all of TX (US)

(73) Assignees: International Business Machines Corporation, Armonk, NY (US); Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/303,364

(22) Filed: Apr. 29, 1999

(51) Int. Cl.⁷ ............................................. G06F 12/00
(52) U.S. Cl. ..................... 711/142; 711/109; 711/117; 711/122; 711/139; 711/212
(58) Field of Search ................ 711/109, 117, 711/122, 139, 142, 212

(56) References Cited

U.S. PATENT DOCUMENTS

| | | | |
|---|---|---|---|
| 5,285,323 A | * 2/1994 | Hetherington et al. | 711/122 |
| 5,317,718 A | * 5/1994 | Jouppi | 711/137 |
| 5,644,752 A | * 7/1997 | Cohen et al. | 711/122 |
| 5,671,444 A | * 9/1997 | Akkary et al. | 710/52 |
| 5,740,399 A | * 4/1998 | Mayfield et al. | 711/137 |
| 6,021,467 A | * 2/2000 | Konigsburg et al. | 711/122 |
| 6,094,708 A | * 7/2000 | Hilla et al. | 711/138 |

\* cited by examiner

*Primary Examiner*—Do Yoo
*Assistant Examiner*—Mehdi Namazi
(74) *Attorney, Agent, or Firm*—Anthony V.S. England; Bracewell & Patterson, L.L.P.

(57) ABSTRACT

A method and system for performing write-through store operations of valid data of varying sizes in a data processing system, where the data processing system includes multiple processors that are coupled to an interconnect through a memory hierarchy, where the memory hierarchy includes multiple levels of cache, where at least one lower level of cache of the multiple of levels of cache requires store operations of all valid data of at least a predetermined size. First, it is determined whether or not a write-through store operation is a cache hit in a higher level of cache of the multiple levels of cache. In response to a determination that cache hit has occurred in the higher level of cache, the write-through store operation is merged with data read from the higher level of cache to provide a merged write-through operation of all valid data of at least the predetermined size to a lower level of cache. The merged write-through operation is performed in the lower level of cache, such that write-through operations of varying sizes to a lower level of cache which requires write operations of all valid data of at least a predetermined size are performed with data merged from a higher level of cache.

17 Claims, 6 Drawing Sheets

METHOD AND SYSTEM FOR WRITE-THROUGH STORES OF VARYING SIZES

BACKGROUND OF THE INVENTION

1. Technical Field

The present invention relates in general to an improved method and system for data processing and in particular to an improved method and system for performing write-through stores in a multiprocessor data processing system. Still more particularly, the present invention relates to a method and system for maintaining cache coherency for write-through store operations in a multiprocessor system where the stores are of varying sizes.

2. Description of the Related Art

In a conventional symmetric multiprocessor (SMP) data processing system, all of the processors are generally identical, that is, the processors all utilize common instruction sets and communication protocols, have similar hardware architectures, and are generally provided with similar memory hierarchies. For example, a conventional SMP data processing system may comprise a system memory, a plurality of processing elements that each include a processor and one or more levels of cache memory and a system bus coupling the processing elements to each other and to the system memory. To obtain valid execution results in a SMP data processing system, it is important to maintain a coherent memory hierarchy, that is, to provide a single view of the contents of memory to all of the processors.

A coherent memory hierarchy is maintained through the use of a selected memory coherency protocol, such as the MESI protocol. In the MESI protocol, an indication of a coherency state is stored in association with each coherency granule (e.g. cache line or sector) of at least all upper level (cache) memories. Each coherency granule can have one of four states, modified (M), exclusive (E), shared (S), or invalid (I), which is indicated by two bits in the cache directory. The modified state indicates that a coherency granule is valid only in the cache storing the modified coherency granule and that the value of the modified coherency granule has not been written to system memory. When a coherency granule is indicated as exclusive, the coherency granule is resident in, of all caches, at that level of the memory hierarchy, only the cache having the coherency granule in the exclusive state. The data in the exclusive state is consistent with system memory, however. If a coherency granule is marked as shared in a cache directory, the coherency granule is resident in the associated cache and in at least one other cache at the same level of the memory hierarchy, all of the copies of the coherency granule being consistent with system memory. Finally, the invalid state indicates that the data and address tag associated with a coherency granule are both in invalid.

A write-through store updates data at each valid level in the cache hierarchy as well as main memory which corresponds to the address accessed. In particular, a write-through or store-through cache operates to provide a write operation to both the cache memory and the main memory during processor write operations, thus insuring consistency between the data in the cache memory and the main memory. To maintain cache coherency, a coherent write-through store must either flush valid matching cache lines on a processor or modify the data associated with a particular line to reflect the update caused by the write-through store. This ensures that subsequent loads from all processors obtain the newly updated data. Typically, a bus "snooping" technique is utilized to initiate invalidation of cache lines.

Preferably, a write-through store can be valid data of varying sizes from one byte up to the largest data type for a particular processor. In certain caches, handling write-through stores of varying size poses problems. In particular some caches do not provide a capability to write valid data less than a particular size. Therefore, to write-through data in these caches a cache line must first be flushed and invalidated, utilizing processor cycles. Thereby, the write-through operation passes by the cache onto the next memory without being written. However, it is preferable to maintain data in the caches for reduced latency accessing. In addition, since flushing for each write-through store is inefficient, it is therefore desirable to provide for the write-through of varying sizes of valid data to caches which do not provide the capability to write valid data less than a particular width.

SUMMARY OF THE INVENTION

It is therefore one object of the present invention to provide an improved method and system for data processing.

It is therefore another object of the present invention to provide an improved method and system for performing write-through stores in a multiprocessor data processing system It is yet another object of the present invention to provide an improved method and system for maintaining cache coherency for write-through store operations in a multiprocessor system where the stores are of varying sizes.

The foregoing objects are achieved as is now described. A method and system for performing write-through store operations of valid data of varying sizes in a data processing system are provided, where the data processing system includes multiple processors that are coupled to an interconnect through a memory hierarchy, where the memory hierarchy includes multiple levels of cache, where at least one lower level of cache of the multiple of levels of cache requires store operations of all valid data of at least a predetermined size. First, it is determined whether or not a write-through store operation is a cache hit in a higher level of cache of the multiple levels of cache. In response to a determination that a cache hit has occurred in the higher level of cache, the write-through store operation is merged with data read from the higher level of cache to provide a merged write-through operation of all valid data of at least the predetermined size to a lower level of cache. The merged write-through operation is performed in the lower level of cache, such that write-through operations of varying sizes to a lower level of cache which requires write operations of all valid data of at least a predetermined size are performed with data merged from a higher level of cache.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
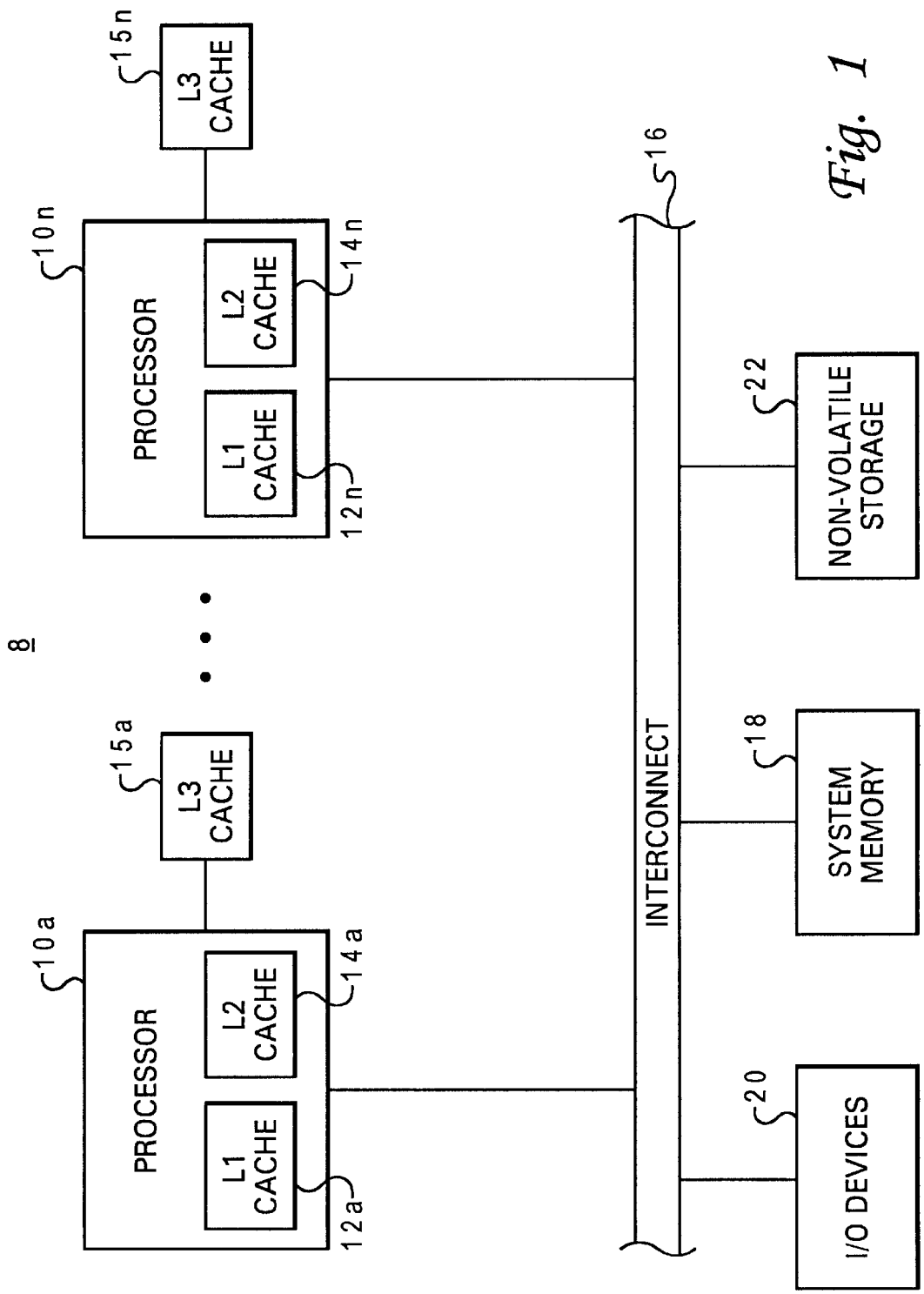
FIG. 1 depicts a high level block diagram of a multiprocessor data processing system in accordance with the present invention.

With reference now to the figures, and in particular with reference to FIG. 1, there is illustrated a high level block diagram of a multiprocessor data processing system in accordance with the present invention. As depicted, data processing system 8 includes a number of processors 10a–10n, which each preferably comprise one of the PowerPC line of processors available from International Business Machines Corporation. In addition to the conventional registers, instruction flow logic and execution units utilized to execute program instructions, each of processors 10a–10n also includes an associated one of on-board level one (L1) caches 12a–12n, which temporarily stores instructions and data that are likely to be accessed by the associated processor. Although L1 caches 12a–12n are illustrated in FIG. 1, as unified caches that store both instruction and data(both referred to hereinafter simply as data), those skilled in the art will appreciate that each of L1 caches 12a–12n could alternatively be implemented as bifurcated instruction and data caches.

In order to minimize latency, data processing system 8 may also include one or more additional levels of cache memory, such as level two (L2) caches 14a–14n, which are utilized to stage data to L1 caches 12a–12n. L2 caches 14a–14n may be on-chip as depicted with L1 caches 12a–12n or may be off-chip. L2 caches 14a–14n function as intermediate storage between level three (L3) caches 15a–15n and L1 caches 12a–12n, and can typically store a much larger amount of data than L1 caches 12a–12n, but at a longer access latency. For example, L2 caches 14a–14n may have a storage capacity of 512 kilobytes, which L1 caches 12a–12n may have a storage capacity of 128 kilobytes.

Data processing system 8 is further supported by lookaside L3 caches 15a–15n which are positioned between interconnect 16 and processors 10a–10n. Each of L3 caches 15a–15n is preferably a 4 M byte static random access memory (SRAM). In particular, L3 caches 15a–15n utilize high performance 8 megabit double data rate (DDR) SRAM. Such SRAMs, do not provide a capability to write data less than the width of the SRAM data bus which is typically 4 bytes for the SRAM described. However, these L3 caches 15a–15n support write-through store transactions which can vary from one to sixteen bytes by the method and system of the present invention. While a particular SRAM has been described, additional fixed length SRAM caches may also be utilized as will be understood by one skilled in the art. In addition, although FIG. 1 depicts only three levels of cache, the memory hierarchy of data processing system 8 could be expanded to include additional levels (L4, L5, etc.) of serially-connected or lookaside caches.

As illustrated, data processing system 8 further includes input/output (I/O) devices 20, system memory 18, and non-volatile storage 22, which are each coupled to interconnect 16. I/O devices 20 comprise conventional peripheral devices, such as a display device, keyboard, and graphical pointer, which are interfaced to interconnect 16 via conventional adapters. Nonvolatile storage 22 stores an operating system and other software, which are loaded into volatile system memory 18 in response to data processing system 8 being powered on. Of course, those skilled in the art will appreciate that data processing system 8 can include many additional components which are not shown in FIG. 1, such as serial and parallel ports for connection to network or attached devices, a memory controller that regulates access to system memory 18, etc.

Interconnect 16, which can comprise one or more buses or a cross-point switch, serves as a conduit for communication transactions between processors 10a–10n, system memory 18, I/O devices 20, and nonvolatile storage 22. A typical communication transaction on interconnect 16 includes a source tag indicating the source of the transaction, a destination tag specifying the intended recipient of the transaction, an address and/or data. Each device coupled to interconnect 16 preferably snoops all communication transactions on interconnect 16.

Figure 2:
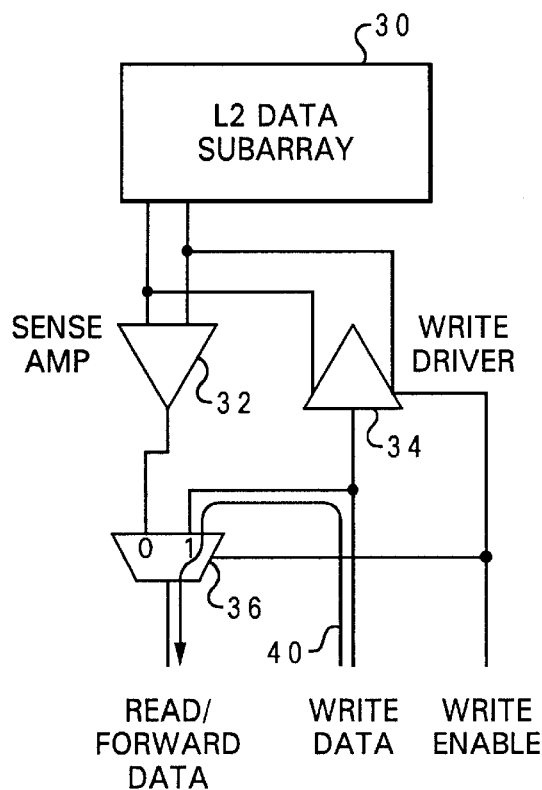
FIG. 2 illustrates a schematic diagram of a path for reading from and writing to L2 cache according to the method and system of the present invention.

Referring now to FIG. 2, there is depicted a schematic diagram of a path for reading and writing the L2 cache according to the method and system of the present invention. An L2 data subarray 30 is provided where data is written to or read from L2 data subarray 30. In particular, the write-through is performed in a high level of cache, such as L2 data subarray 30 which preferably contains a byte of a 32 byte sector of the 512 kilobytes available in an L2 cache. For write-through stores, when performing a write-through of a subset of the 32 byte sector, in the case of a cache hit, the bytes that are not being updated are read out of L2 data subarray 30 through sense amp 32. The bytes being written are forwarded to a respective position of L2 data subarray 30 by write driver 34 and forwarded to L3 cache. The read and forwarded data is merged in a store queue (not shown). Write driver 34 is enabled by a write enable signal which also enables a multiplexer 36. The write enable signal specifies byte by byte whether to output data read from L2 data subarray 30 through multiplexer 36, or to forward the data being written to L2 data subarray 30 through multiplexer 36.

For all write-through operations, bytes being written are preferably quickly forwarded to an L3 cache as illustrated by path 40. In the case of a write-through operation of 32 bytes that hits in the L2 cache, all data is forwarded to the L3 cache as illustrated by path 40 without merging with data from L2 data subarray 30. While the figure is depicted for a higher level L2 cache passing read/forward data to a lower level L3 cache, other higher level and lower level caches may also be utilized. In addition, while this figures and others following utilize a sector of 32 bytes of data, other sizes of data sectors may also be utilized.

Figure 3:
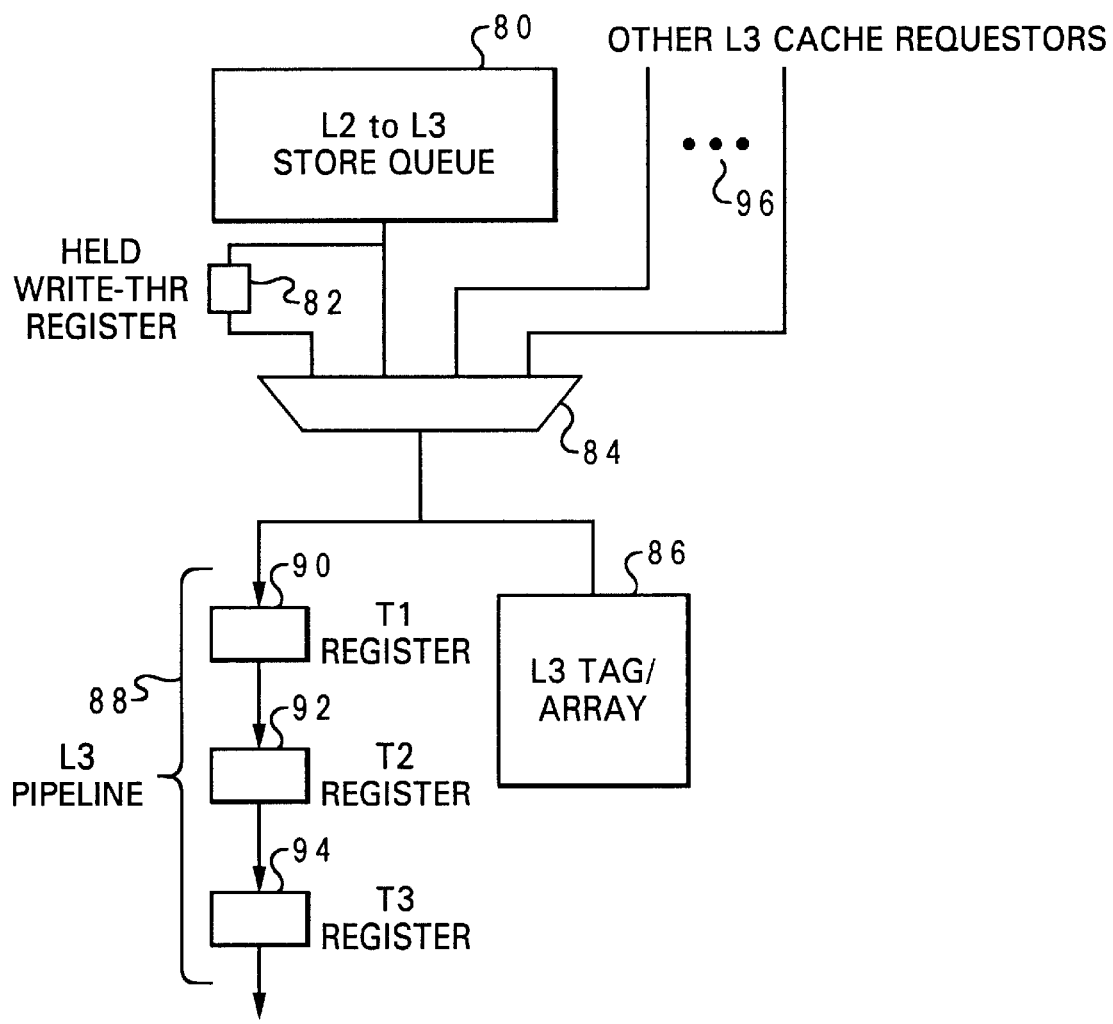
FIG. 3 depicts a high level block diagram of the address pipeline for an L3 cache.

With reference now to FIG. 3, there is illustrated a high level block diagram of the address pipeline for an L3 cache. An L2 to L3 store queue 80 holds write-through transaction data forwarded from the L2 cache. In particular, for each write-through operation, a 32-byte bit is set if the transaction includes 32 bytes of valid data either from the original write-through store or from a read of the L2 cache. If the 32-byte bit is not set, when the write-through transaction is issued from store queue 80, the write-through transaction is synthesized to a flushing operation and a copy of the queued write-through store transaction is placed in held write-through register 82. A multiplexer 84 decides between transactions from held write-through register 82, store queue 80 and other L3 cache requests 96. When a transaction passes through multiplexer 84, the transaction is placed in L3 pipeline 88. In the present embodiment, L3 pipeline 88 provides three pipeline stages by T1 register 90, T2 register 92 and T3 register 94 where data passes through each pipeline register. In addition, an L3 tag array 86 is provided to maintain a record of data resident in the L3 cache.

Figure 4:
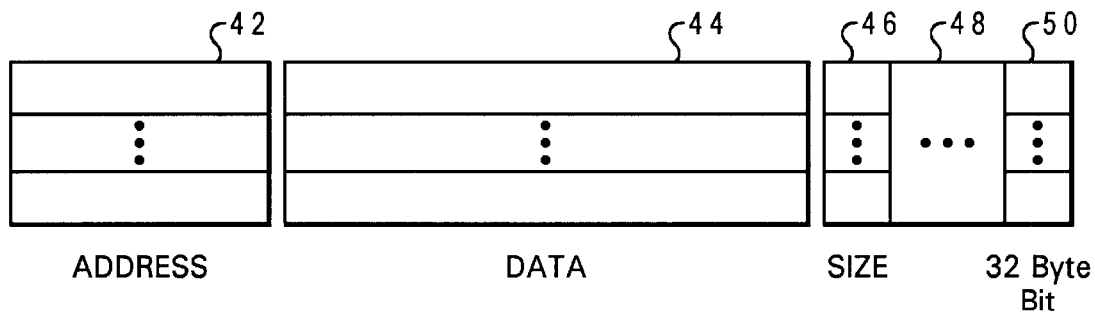
FIG. 4 illustrates a block diagram representation of the L2 to L3 store queue depicted in FIG. 3.

Referring now to FIG. 4, there is illustrated a block diagram representation of the L2 to L3 store queue depicted in FIG. 3. The queue passing operation preferably passes an address 42, data 44, original size attribute 46, other instruction information 48, and a 32-byte bit 50 with each write-through store transaction. 32-byte bit 50 provides an indicator that the write-through transaction has all 32 bytes valid and up-to-date with respect to cache coherency and was originally 32 bytes or hit in the L2 cache (i.e. the data is the merged result of the L2 cache with the write-through data). However, if the transaction included less than 32 valid bytes, then 32-byte bit 50 is not set. Original size attribute 46 tracks the size of the write-through store without merged data such that other memory devices which can write-through data of varying sizes may utilize the original data size in doing so.

Figure 5:
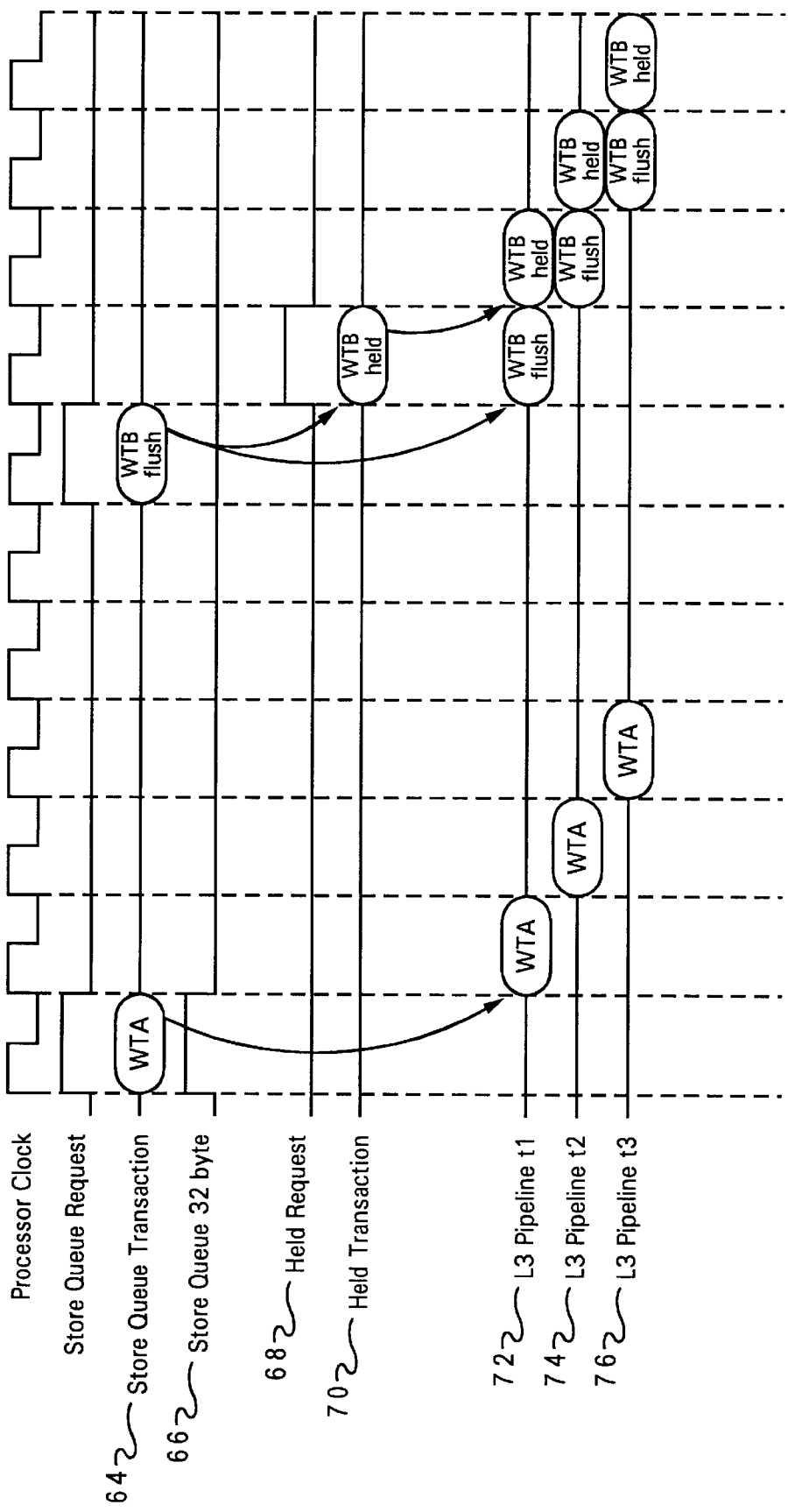
FIG. 5 depicts a timing diagram representation of two write-through store transactions in L3 cache.

With reference now to FIG. 5, there is depicted a timing diagram representation of two write-through store transactions in L3 cache. In a first example, the 32-byte bit is set as illustrated at reference numeral 66. Since the 32-byte bit is set for the write-through transaction WTA, in the next clock cycle, WTA is passed to the L3 pipeline and possibly written to the L3 cache if that sector is resident and valid as depicted at reference numeral 72. Thereafter, for the next two clock cycles, WTA is passed through the T2 and T3 stages of the L3 pipeline as illustrated at reference numerals 74 and 76. In addition, WTA is passed on to main storage which ignores the 32-byte bit.

In a second example, the 32-byte bit is not set when the WTB store transaction is made as depicted at reference numeral 64. Since the 32-byte bit is not set, the L3 cannot perform the transaction as is since the transaction may overwrite potentially valid data in L3 cache. In particular, when WTB enters the L3 pipeline, the transaction is interpreted as a flushing operation since the 32-byte bit is not set as depicted at reference numeral 66. By setting the transaction as a WTB flush, a modified sector will be cast out of the L3 cache and the status of that sector updated to invalid. Further, for valid non-modified sectors, no cast out is generated, but the status of the sector is updated to invalid.

During the cycle that WTB flush is accepted into the L3 pipeline, the entire write-through transaction is registered in the held write-through register as WTB held as depicted at reference numerals 68 and 70. Thereafter, during the cycle after WTB flush is accepted into the L3 pipeline, the WTB held copy of the write-through store requests access to the L3 cache and is placed on the L3 pipeline. When the WTB held is accepted from the pipeline, WTB held sees an invalid sector since it follows the synthesized flush operation. The original write-through store, WTB held, can now be passed directly to the main storage with no need to update the L3 cache since a cache hit will not occur for the write-through operation.

Figure 6:
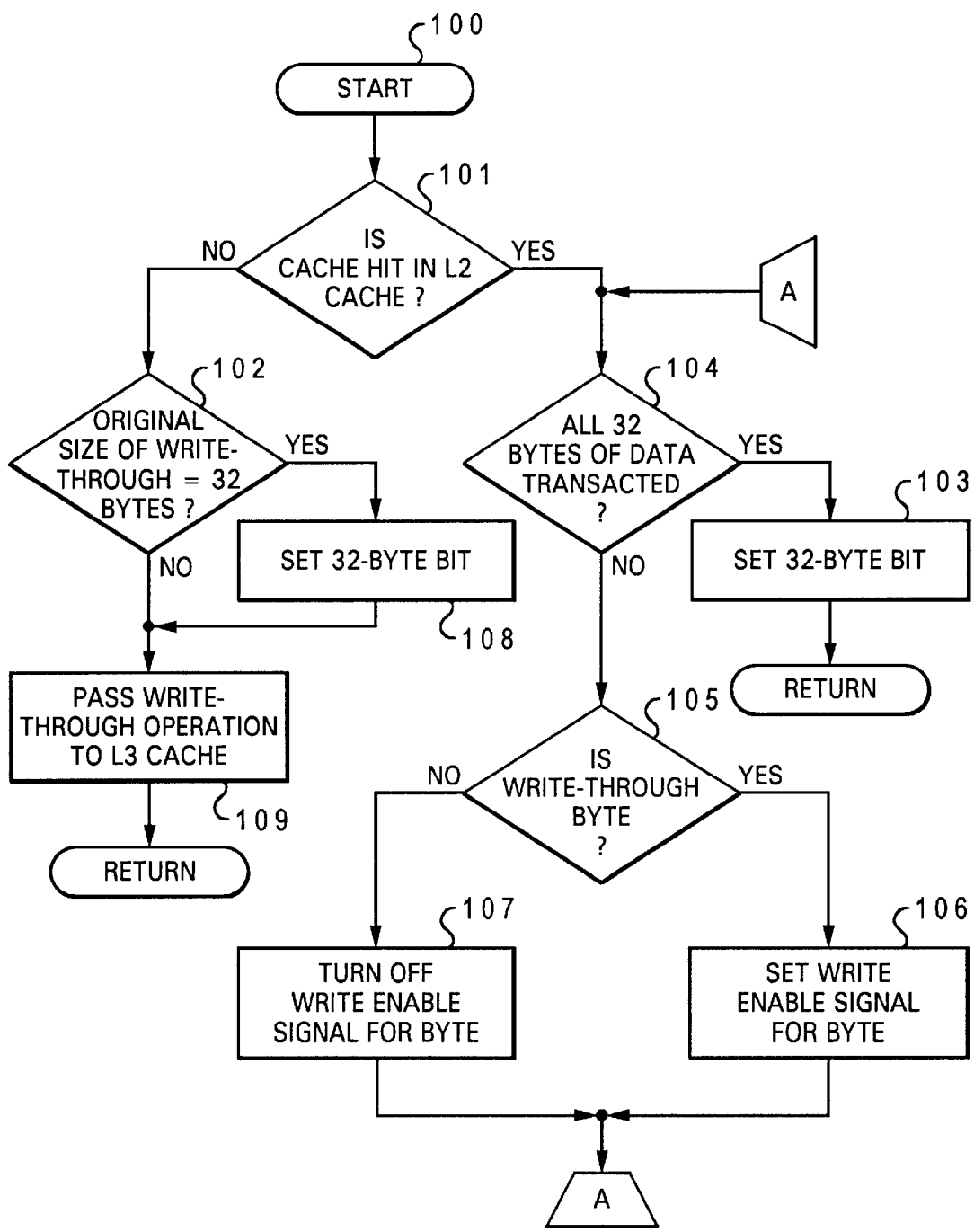
FIG. 6 illustrates a high level logic flowchart of a process for passing a write-through store transaction from a higher level of cache to a lower level.

Referring now to FIG. 6 there is illustrated a high level logic flowchart of a process for passing a write-through store transaction from a higher level of cache to a lower level. As depicted, the process starts at block 100 and proceeds to block 101. Block 101 depicts a determination of whether or not there is a cache hit for the write-through store within a segment of the higher level cache, in particular the L2 cache. If there is not a cache hit, the process passes to block 102. Block 102 illustrates a determination of whether the original write-through store has 32 bytes of valid data. If the original size of the write-through operation is 32 bytes of valid data, the process passes to block 108. Block 108 depicts setting the 32-byte bit for the write-through transaction whereafter the process passes to block 109. If the original size of the write-through operation is not 32 bytes of valid data, the process passes to block 109. Block 109 illustrates passing the write-through operation to the store queue of the L3 cache whereafter the process returns.

Returning to block 101, if there is a cache hit, the process passes to block 104. Block 104 depicts a determination of whether or not all 32-bytes have been transacted. If all 32 bytes have been transacted, the process passes to block 103. Block 103 illustrates setting the 32-byte bit for the write-through store operation in the store queue.

Returning to block 104, if all 32 bytes of data are not yet transacted, the process passes to block 105. Block 105 illustrates a determination of whether or not the byte of data is a write-through byte of data. If the data is a write-through byte of data, the process passes to block 106. Block 106 depicts setting the write enable signal for each write-through data byte whereafter the process passes to block 104. If the data is not a write-through byte of data, the process passes to block 107. Block 107 illustrates setting the write enable signal off, such that data is read out of the L2 cache whereafter the process passes to block 104.

Figure 7:
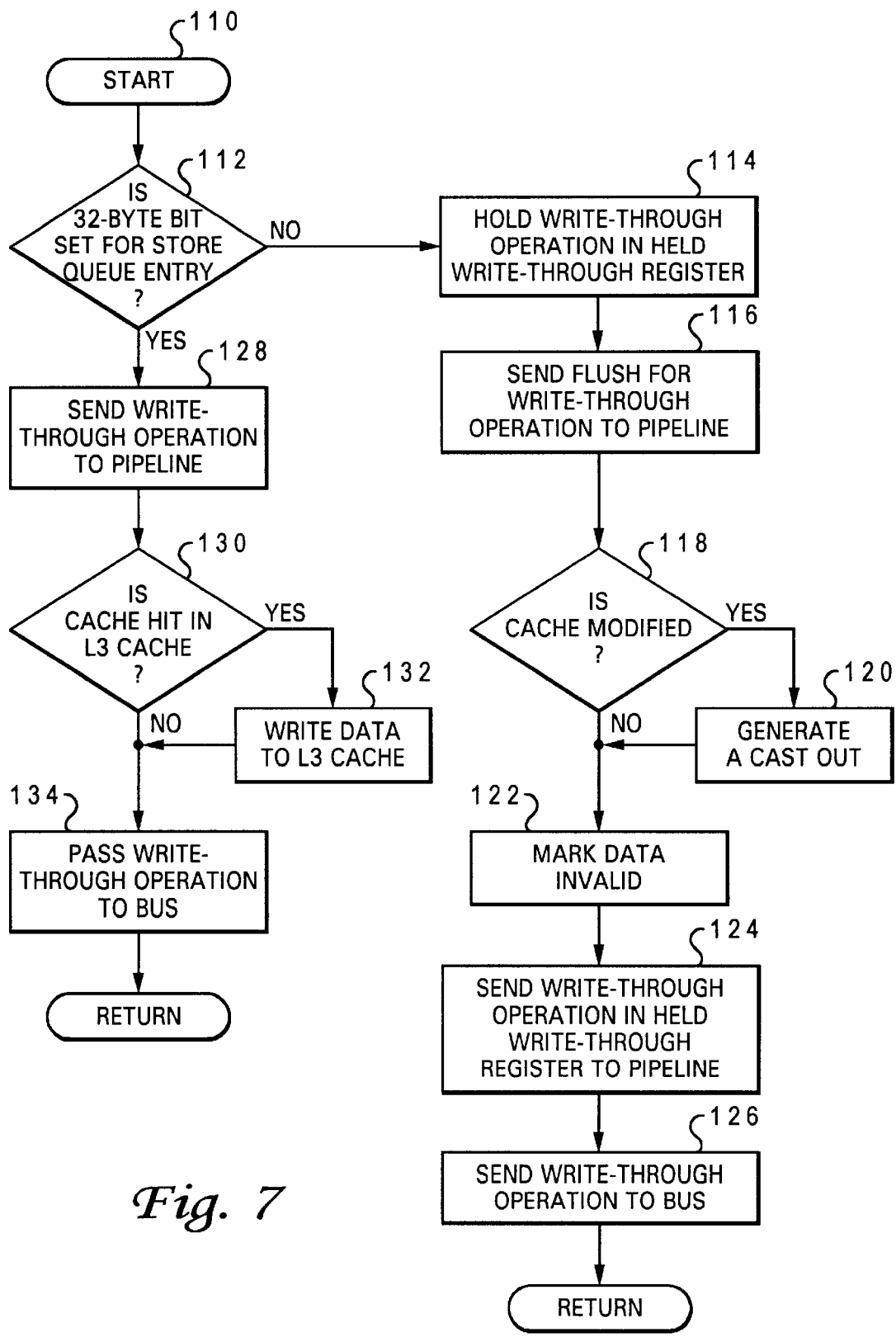
FIG. 7 depicts a high level logic flowchart of a process for issuing a write-through store instruction to L3 cache.

With reference now to FIG. 7 there is depicted a high level logic flowchart of a process for issuing a write-through store operation to L3 cache. As illustrated, the process starts at block 110 and proceeds to block 112. Block 112 depicts a determination of whether or not a 32-byte bit is set for the write-through operation being processed next from the store queue. If the 32-byte bit is not set for the write-through store operation, the process passes to block 114. Block 114 illustrates holding a copy of the write-through operation in a held write-through register. Thereafter, block 116 depicts sending a flush command for the write-through operation to the cache pipeline. Next, block 118 illustrates a determination of whether or not the data in the cache to be flushed is marked as modified. If the data in the cache is marked as modified, the process passes to block 120. Block 120 depicts the generation of a cast out transaction for the data in the cache such that the data is written to another memory level, preferably system memory 18 of FIG. 1. Thereafter, the process passes to block 122. If the cache is not marked modified, the process passes to block 122. Block 122 illustrates marking the data in the cache to be flushed as invalid. Thereafter, block 124 depicts sending the write-through operation in the held write-through register to the L3 cache pipeline. Next, block 126 illustrates passing the write-through operation onto the bus whereby other caches and memory locations may be updated. Since the matching data in the cache is flushed, the write-through operation will not encounter a cache hit in the L3 cache, and therefore will pass the write-through operation on to the next memory level without writing to the L3 cache.

Returning again to block 112, if the 32-byte bit for the write-through operation being processed next is set, the process passes to block 128. Block 128 depicts sending the write-through operation to the pipeline. Thereafter, block 130 illustrates a determination of whether or not there is a cache hit in the L3 cache for the write-through operation. If there is a cache hit in L3 cache, the process passes to block 132. Block 132 depicts writing the write-through operation data to the L3 cache whereafter the process passes to block

134. If there is not a cache hit in L3 cache, the process passes to block 134. Block 134 illustrates passing the write-through operation to the next memory level whereafter the process returns.

While the invention has been particularly shown and described with reference to a preferred embodiment, it will be understood by those skilled in the art that various changes in form and detail may be made therein without departing from the spirit and scope of the invention.

We claim:

1. A method of performing write-through store operations of valid data of varying sizes in a data processing system, where said data processing system includes a plurality of processors that are coupled to an interconnect through a memory hierarchy, where said memory hierarchy includes a plurality of levels of cache, where at least one lower level of cache of said plurality of levels of cache requires write operations of all valid data of at least a predetermined size, said method comprising the steps of:

detecting whether or not a write-through store operation is a cache hit in a higher level of cache of said plurality of levels of cache;

merging said write-through store operation with data read from said higher level of cache to provide a merged write-through operation of said all valid data of at least said predetermined size to said lower level of cache, in response to detecting a cache hit in said higher level of cache; and writing said merged write-through operation in said lower level of cache, in response to detecting a cache hit in said lower level of cache for said write-through operation, such that the write-through operations of valid data of varying sizes to said lower level of cache which requires write operations of said all valid data of at least said predetermined size are performed with data merged from said higher level of cache.

2. The method of performing write-through store operations according to claim 1, said method further comprising the step of:

passing said write-through operation to said lower level of cache without merging data, in response to not detecting a cache hit in said higher level of cache;

determining whether or not said write-through operation is said all valid data of at least said predetermined size; and setting a valid byte indication flag for said write-through operation, in response to determining that said write-through operation is said all valid data of at least said predetermined size.

3. The method of performing write-through store operations according to claim 2, said method further comprising the steps of:

storing said write-through store operation in a store queue until issued within said lower level of cache;

determining whether said valid byte indication flag is set for said write-through operation issued from said store queue, in response to a detecting a cache hit in said lower level of cache for said write-through operation; and in response to determining that said valid byte indication flag is not set for said write-through operation:
   storing said write-through store operation in a register;
   flushing a portion of said cache of said predetermined size to which said write-through store operation is targeted; said passing said write-through store operation from said register to a next level of cache of said plurality of levels of cache.

4. The method of performing write-through store operations according to claim 2, said method further comprising the steps of:

storing said write-through store operation in a store queue until issued within said lower level of cache;

determining whether said valid byte indication flag is set for said write-through operation issued from said store queue, in response to a detecting a cache hit in said lower level of cache for said write-through operation; and in response to determining that said valid byte indication flag is set for said write-through operation:
   writing said write-through store operation in a lower level of cache; and
   passing said write-through store operation to said next level of cache of said plurality of levels of cache.

5. The method of performing write-through store operations according to claim 1, said method further comprising the step of:

storing said merged write-through operation in a store queue until issued within said lower level cache.

6. The method of performing write-through store operations according to claim 1, said method further comprising the step of:

indicating that said write-through store operation is said all valid data of at least a predetermined size by setting said valid byte indication flag.

7. A data processing system comprising:

an interconnect;

a plurality of processors coupled to said interconnect through a memory hierarchy;

said memory hierarchy which includes a plurality of levels of cache;

at least one lower level of cache of said plurality of levels of cache which requires store operations of valid data of at least a predetermined size;

means for detecting whether or not a write-through store operation is a cache hit in a higher level of cache of said plurality of levels of cache;

means for merging said write-through store operation with data read from said higher level of cache to provide a merged write-through operation of all said valid data of at least said predetermined size to a lower level of cache, in response to detecting a cache hit in said higher level of cache; and means for writing said merged write-through operation in said lower level of cache, in response to detecting a cache hit in said lower level for said write-through operation, such that write-through operations of varying sizes to said lower level of cache which requires write operations of said valid data of at least said predetermined size are performed with data merged from a higher level of cache.

8. The data processing system according to claim 7, said system further comprising:

means for passing said write-through operation to said lower level of cache without merging data, in response to not detecting a cache hit in said higher level of cache;

means for determining whether or not said write-through operation is all said valid data of at least said predetermined size; and means for setting a valid byte indication flag for said write-through operation, in response to determining that said write-through operation is all said valid data of at least said predetermined size.

9. The data processing system according to claim 8, said system further comprising:
   a store queue for storing said write-through store operation until said write-through store operation is issued within said lower level of cache;
   means for determining whether said valid byte indication flag is set for said write-through operation issued from said store queue, in response to detecting a cache hit for said write-through operation in said lower level cache;
   means for storing said write-through store operation in a register, in response to determining that said valid byte indication flag is not set for said write-through operation;
   means for flushing a portion of said cache of said predetermined size to which said write-through store operation is targeted; and
   means for passing said write-through store operation from said register to next level of cache of said plurality of levels of cache.

10. The data processing system according to claim 9, wherein said means for storing said write-through operation comprises:
   a register for holding said write-through store operation during flushing, said register for issuing said write-through store operation after a flushing operations is issued.

11. The data processing system according to claim 8, said system further comprising:
   a store queue for storing said write-through store operation until said write-through store operation is issued within said lower level of cache;
   means for determining whether said valid byte indication flag is set for a write-through operation issued from said store queue, in response to detecting a cache hit for said write-through operation in said lower level cache;
   means for writing said write-through store operation in said lower level of cache, in response to determining that said valid byte indication flag is set for said write-through operation; and
   means for passing a write-through store operation to a next level of cache of said plurality of levels of cache.

12. The data processing system according to claim 7, said system further comprising:
   means for determining whether or not a write-through store operation is all said valid data of at least said predetermined size; and
   a size indication flag which is set in response to determining that said write-through store operation is all said valid data of at least said predetermined size.

13. The data processing system according to claim 7, said system further comprising:
   a store queue for holding write-through operations at said lower level of cache until said write-through operations are issued.

14. The data processing system according to claim 7, wherein said means for merging said write-through store operation with data read from said higher level of cache to provide a merged write-through operation of all valid data of at least said predetermined size to a lower level of cache, in response to detecting a cache hit in said higher level of cache further comprises:
   a sense amp for reading data from said higher level cache;
   a write driver for writing data to said higher level cache;
   a multiplexer for selecting from said data read from said higher level cache and said data being written to said higher level cache; and
   a write-enable signal for enabling said multiplexer for selection.

15. The data processing system according to claim 7, said means for writing said merged write-through operation in said lower level of cache further comprising:
   a store queue for holding said merged write-through operation until said merged write-through operation is issued;
   a multi-level pipeline for passing said write-through operation to said lower level cache to be performed.

16. The data processing system according to claim 7, wherein said lower level of cache which requires store operations of at least said predetermined size is an L3 cache.

17. The data processing system according to claim 7, wherein said higher level of cache is an L2 cache.

* * * * *